March 4, 1952     S. F. STEWART ET AL     2,588,175
INDUCTOR ALTERNATOR

Filed Sept. 23, 1950     2 SHEETS—SHEET 1

INVENTORS
SEYMOUR FLOYD STEWART
BY ALBERT D. GILCHRIST
Hudson, Creighton,
Williams, David & Hoffmann.
ATTORNEYS

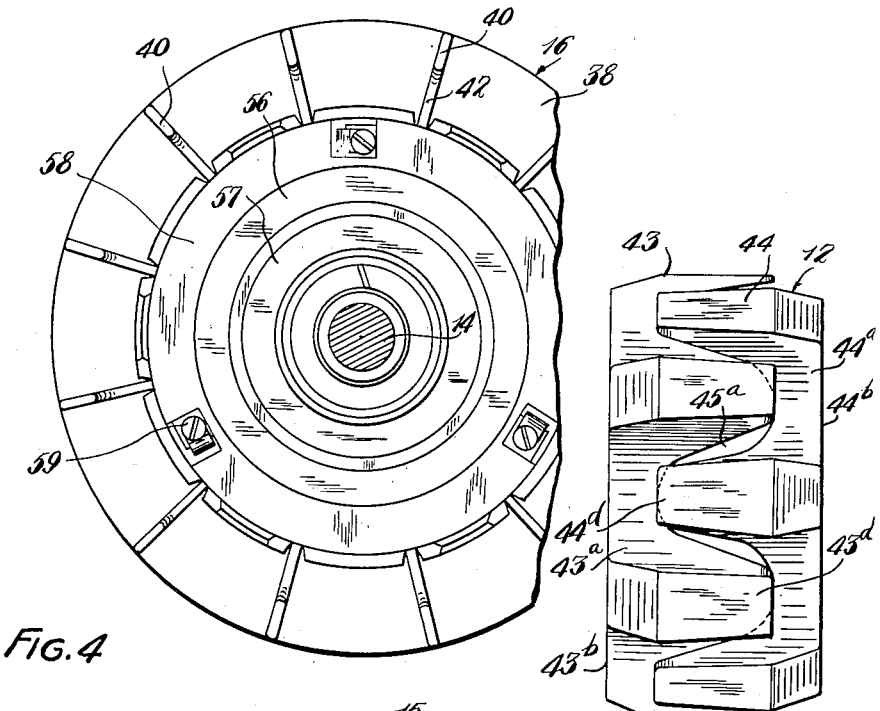
Fig. 4
Fig. 5
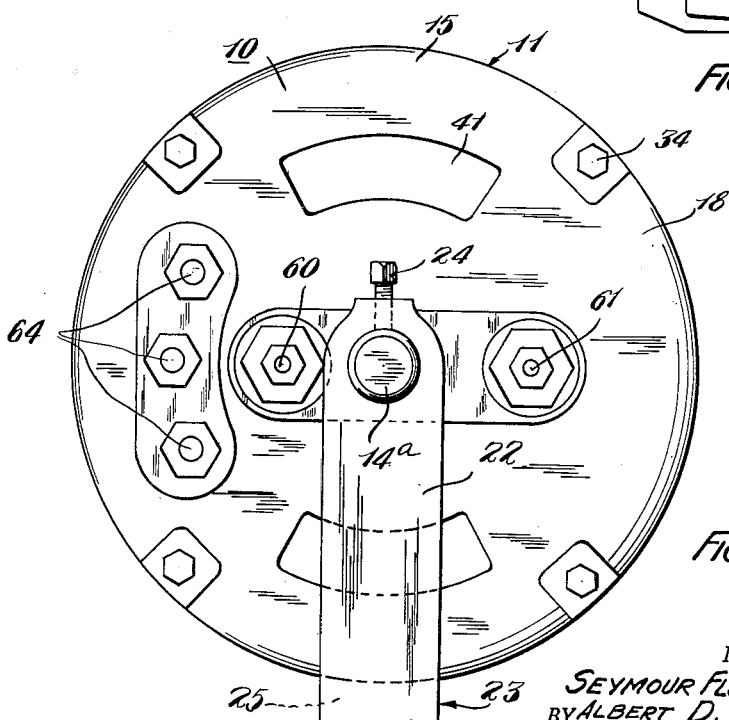
Fig. 3

Patented Mar. 4, 1952

2,588,175

UNITED STATES PATENT OFFICE 2,588,175

INDUCTOR ALTERNATOR

Seymour Floyd Stewart, Shaker Heights, and Albert D. Gilchrist, Lyndhurst, Ohio, assignors to The Leece-Neville Company, Cleveland, Ohio, a corporation of Ohio Application September 23, 1950, Serial No. 186,400

3 Claims. (Cl. 171—252)

This invention relates to electrical generating machines and, more particularly, to an improved construction for an inductor alternator.

As one of its objects, this invention provides an improved inductor alternator which is of a relatively simplified construction but which is also rugged and durable in character and efficient in operation.

Another object is to provide an inductor alternator having a novel frame or housing construction which includes stationary and rotatable housing members defining the ends of the alternator housing and a preformed stator member located between such housing members and mounted on the stationary housing member.

A further object is to provide an inductor alternator of this character in which the field winding is carried by a rotor operable in the stator member and mounted for rotation on a stationary shaft carried by the stationary housing member, and in which the rotatable housing member is connected for rotation with and drives the rotor.

Still another object is to provide an inductor alternator of the character mentioned in which the rotatable housing member is a disk member located in spaced relation to the stator member so as to define therebetween an annular air passage and in which air impeller blades carried by the disk member are operable in the air passage.

As a further object, this invention provides an inductor alternator of the kind mentioned in which the rotor comprises a pair of complemental rotor members having axial teeth in meshing relation, one of which rotor members has the rotatable housing member connected therewith and the other of which carries contact rings for the field winding.

The invention can be further briefly summarized as consisting in certain novel combinations and arrangements of parts hereinafter described and particularly set out in the claims hereof.

In the accompanying sheets of drawings,

Fig. 3 is an end view of the alternator as seen from the stationary housing member end thereof;

Fig. 4 is a transverse section taken through the alternator on the irregular section line 4—4 of Fig. 2; and Fig. 5 is a partial side elevation of the rotor in detached relation and showing the meshing relation of the teeth of the complemental rotor members.

Figure 2:
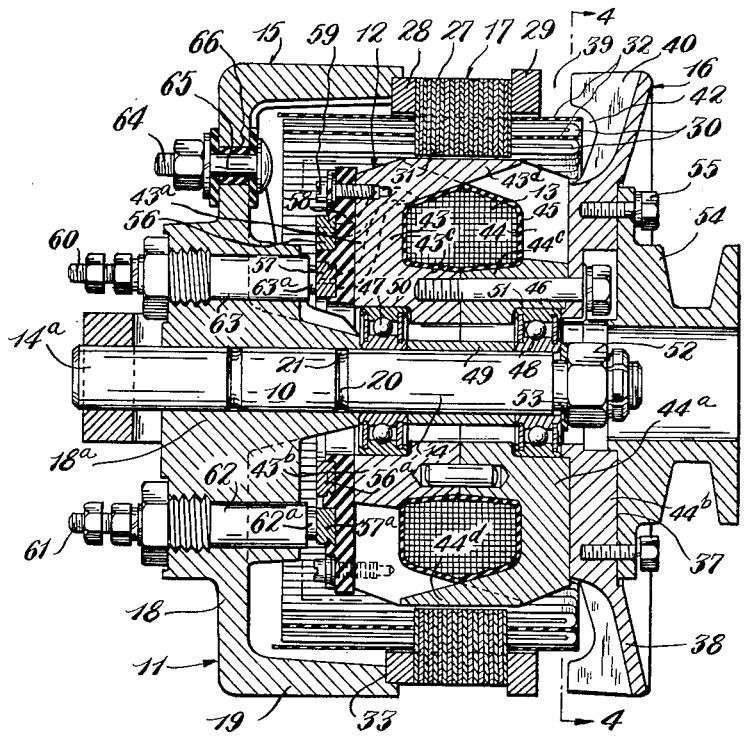
Fig. 2 is a longitudinal section taken through the alternator on a substantially horizontal plane, as indicated by section line 2—2 of Fig. 1.

In the embodiment of the invention herein disclosed, the improved inductor alternator 10 comprises, in general, a frame structure or housing 11 and a rotor 12 operable in such housing and carrying a field winding 13. The alternator 10 also includes a shaft 14 which, in this instance, is a stationary shaft mounted in fixed relation in the housing 11 and on which the rotor 12 is mounted for rotation as hereinafter explained.

The housing 11 comprises a stationary housing member 15, a rotatable housing member 16 and a stator member 17 located between these rotatable and stationary housing members and carried by the latter. The stationary and rotatable housing members 15 and 16 form the two opposite ends of the housing 11 and the stator member 17 forms the intermediate portion of the alternator housing. As will be further explained hereinafter, the housing member 16 is connected with the rotor 12 for rotation therewith and for that reason can also be properly considered as being a part of the rotor. However, since this housing member has substantially the same outside diameter as the stationary housing member 15 and defines an end of the alternator housing 11, we prefer to designate the member 16 as a housing member.

The stationary housing member 15 is a substantially cup-shaped member having a transverse end wall 18 and an axially extending annular wall 19 integrally connected with the transverse wall and extending therefrom in substantially coaxial relation to the shaft 14. The transverse end wall 18 is provided with a thickened hub-like central portion 18a in which the rear end of the shaft 14 is mounted in fixed relation. The housing member 15 is constructed as a casting which is preferably of non-magnetic material such as aluminum and, hence, the shaft 14 can be cast in place in the hub portion 18a and an interlock between the shaft and hub portions can be obtained by providing the shaft with one or more annular grooves 20 into which integral locking beads 21 of the hub portion extend.

The shaft 14 includes a rear extension 14a which projects rearwardly from the hub portion 18a and is adapted to be engaged by the upright arm 22 of a base 23 upon which the alternator 10 is supported. The shaft projection 14a is retained in the arm 22 as by means of a set screw 24. The base 23 also includes a forwardly extending horizontal plate portion 25 at the bottom thereof which can be mounted on a bracket 26, or on any other available support. The alternator 10 is also supported, in part, by the direct engagement of the stationary portion of the housing 11 with the top face 23a of the plate portion 25.

The stator member 17 comprises a laminated ring 27 of magnetic material and a pair of clamping rings 28 and 29 disposed on opposite sides of the laminated ring and connected with the latter as by suitable screws or rivets (not shown) extending through these rings. The stator member 17 also includes an annular series of inductor elements 30 mounted in slots 31 provided in the inner periphery of the laminated ring 27 and suitably insulated from each other and from the laminated ring by the electrical insulating sheet material 32.

Figure 1:
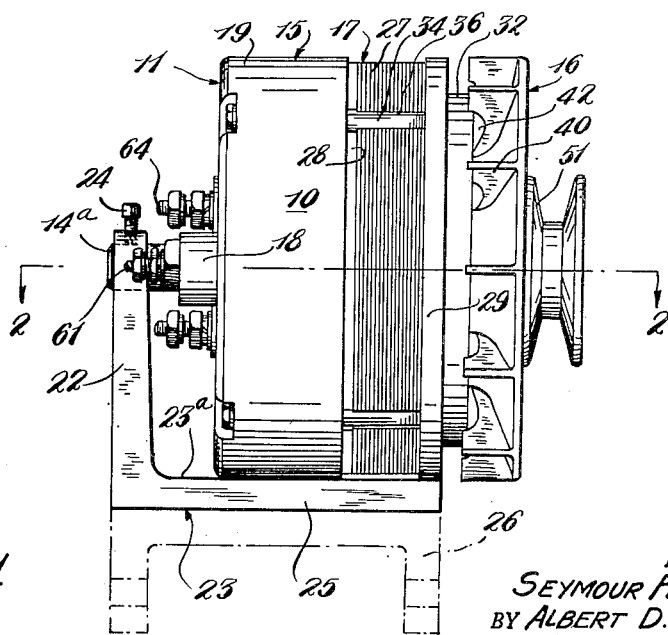
Fig. 1 is an outside elevation of an inductor alternator embodying the present invention.

The stator member 17 is mounted on the stationary housing member 15 so as to constitute an axial extension of the annular wall 19. For this purpose the forward end of the annular wall 19 is provided with a recessed annular seat 33 in which the clamping ring 28 of the stator member 17 has seating engagement, as shown in Fig. 2. The stator member 17 is held in connected relation with the stationary housing member 15 by this seating engagement and by the connecting screws 34. As shown in Fig. 1, the connecting screws 34 are located at points spaced circumferentially around the stationary housing member 15 and extend through this housing member so that their threaded forward ends engage in threaded openings of the outer clamping ring 29. Clearance slots 36 are provided in the outer periphery of the laminated ring 27 and the inner clamping ring 28 to accommodate these screws, as is shown in Fig. 1.

The rotatable housing member 16 comprises a disk member having a central plate portion 37 and an annular flange or rim portion 38 carried by such plate portion and extending outwardly therefrom in a generally radial direction but inclined somewhat in a forward direction away from the stator member 17. The housing member 16 is located in axially outwardly spaced relation to the clamping ring 29 of the stator member 17 so as to define therebetween an annular air discharge space or passage 39.

The rotatable housing member 16 also includes an annular series of substantially radial blades or vanes 40 which are integrally connected with the central plate portion 37 and the flange portion 38 and extend in a rearward axial direction from the latter. The blades 40 are air impelling blades which extend into and are operable in the annular air passage 39 so that during the rotation of this housing member these blades will cause air to be thrown outwardly by centrifugal force and thus induce a flow of cooling air through the alternator. For the purpose of this flow of cooling air the stationary housing member 15 is provided with one or more air inlet openings 41 which, in this instance, are located in the transverse end wall 18, as shown in Fig. 3.

In connection with this cooling feature of the alternator 10, it will be observed that the inductor elements 30 of the stator member 17 have their forward ends projecting into the air delivery passage 39 so as to be contacted and traversed directly by the cooling air. The blades 40 of the rotatable housing member 16 have recesses 42 in the rear edges thereof which provide clearance between this housing member and the inductor elements 30. It will be noted also that the insulating sheet material 32 extends forwardly into the air passage 39 in covering relation to the inductor elements 30 so that these elements will not be exposed to damage or to contact by water, dust or other foreign matter.

The rotor 12 comprises a pair of complemental rotor members 43 and 44 forming a field magnet adapted to be energized by the winding 13. These rotor members include transverse end wall portions 43a and 44a which have substantially flat transverse end faces 43b and 44b. These rotor members also include hub portions 43c and 44c formed integral with the end wall portions 43a and 44a and which hub portions extend toward each other and into abutting relation, as shown in Fig. 2.

The complemental rotor members 43 and 44 carry annular groups of circumferentially spaced axially extending integral teeth 43d and 44d of an axially tapering thickness. These rotor members are disposed in a face-to-face relation so as to define therebetween a hollow chamber 45 which is surrounded by the groups of teeth and in which the field winding 13 is located. The group of teeth 43d of the rotor member 43 extend into meshing relation with the teeth 44d of the rotor member 44. In this meshing relation the teeth of one rotor member extend into the spaces between the pairs of teeth of the other rotor member but the teeth of each rotor member are entirely out of metallic contact with the teeth of the other rotor member by reason of an intervening air space 45a therebetween, as shown in Fig. 5.

As shown in Fig. 2, the rotor members 43 and 44 have an assembled relation in which the groups of teeth 43d and 44d extend into the intermeshing relation just described above and in which the integral hub portions 43c and 44c are in abutting engagement with each other. The rotor members 43 and 44 are connected with each other so as to be maintained in this relation by means of the connecting screws 46 which also serve to connect the rotatable housing member 16 with the rotor 12. The screws 46 extend through the plate portion 37 of the housing member 16, as well as through the hub portion 44c of the rotor member 44, and their inner ends engage in threaded openings of the rotor member 43. By means of the connecting screws 46 the plate portion 37 of the rotatable housing member 16 is held in tightly clamped relation against the transverse flat end face 44b of the rotor member 44 for rotation of this housing member with the rotor 12.

The rotor 12 is mounted for rotation on the stationary shaft 14 by means of a pair of axially spaced antifriction bearings 47 and 48. These bearings have their inner races mounted on the shaft 14 and maintained in axially spaced relation by a spacing sleeve 49. The rotor 12 is mounted on the outer races of the bearing 47 and 48 and for this purpose the rotor members 43 and 44 are provided with recessed annular seats 50 and 51 which engage these outer races. The rotor is positioned axially of the shaft 14 by reason of the fact that the inner races of the bearings 47 and 48 and the spacing sleeve 49 are clamped against the inner end of the hub portion 18a of the housing member 15 by nut and washer members 52 and 53 mounted on the forward end of the shaft 14.

The rotor 12 is driven by the rotatable housing member 16 which, in turn, is adapted to be driven by torque applied to a pulley 54. This pulley is mounted on the forward face of the plate portion 37 and is connected therewith by screws 55.

The field winding 13 produces magnetization of the rotor members 43 and 44 and, during rotation of these members, the lines of force of the magnetic field will cut the inductor elements 30 to induce electric currents therein. The inductor elements 30 are provided in such number and arrangement as to have a desired phase relation for the alternating current being generated. In this instance the alternator 10 is a three-phase alternator and the inductor elements 30 constitute three groups which are electrically connected to define the three-phase inductor windings.

For supplying energizing current to the field winding 13, the rotor 12 is provided with a pair of contact rings 56 and 57 with which the ends of this field winding are connected. These contact rings are disposed in a concentric relation around the shaft 14 and are carried by an insulating disk 58 which is mounted on the rotor 12 by being clamped against the flat transverse end face 43a of the rotor member 43 by means of the screws 59. The contact rings 56 and 57 are mounted on the insulating disk 58 by being provided with dovetail portions 56a and 57a which engage in grooves of a corresponding dovetail shape. The contact rings can be mounted on the insulating disk 58 by having their dovetail portions molded in the disk.

The field terminals of the alternator 10 are formed by the threaded stem portions 60 and 61 of a pair of brush holders 62 and 63 which are mounted in axial openings of the transverse end wall 18 of the stationary housing member 15. The brush holders 62 and 63 have axially slidable brushes 62a and 63a mounted therein and whose forward end faces engage the contact rings 56 and 57.

Since the alternator 10 is a three-phase alternator it is provided with three load terminals 64 which are mounted on the stationary housing member 15 and are electrically connected with the inductor windings of the stator member 17. The load terminals 64 are formed by the threaded outer ends of the screws 65 which extend through openings of the transverse end wall 18 of the stationary housing member and are insulated from the latter by the insulating sleeves 66.

From the accompanying drawings and the foregoing detailed description it will be seen that the inductor alternator 10 is of a simplified but very compact construction in which the field winding is carried by the rotor and the inductor windings are carried by a preformed stator member which is adapted to be assembled into the stationary housing member. It will also be seen that the driving force for the rotor is applied thereto through a rotatable member which defines one end of the alternator housing and also carries air impeller blades for producing a flow of cooling air through the machine. Additionally, it will be seen that the rotor comprises complemental toothed members and is rotatably mounted on a fixed shaft carried by the stationary housing member.

Although the improved inductor alternator of this invention has been illustrated and described herein to a somewhat detailed extent it will be understood, of course, that the invention is not to be regarded as being limited correspondingly in scope but includes all changes and modifications coming within the terms of the claims hereof.

Having thus described our invention, we claim:
1. In an alternating current generator of the character described, a stationary hollow housing member comprising a transverse end wall and an annular wall connected with said end wall and extending axially therefrom, annular seat means on said annular wall at the open end thereof, a fixed shaft mounted in said end wall and extending coaxially in said stationary housing member, a rotor mounted for rotation on said shaft and carrying a field winding, a rotatable annular housing member connected with said rotor for rotation therewith and disposed in axially spaced relation to said stationary housing member, a stator member surrounding said rotor and disposed between said rotatable and stationary housing members and connected with the latter in engagement with said annular seat means, said stator member being a preformed assembly unit comprising a laminated annular member and an annular series of inductor elements mounted therein, said shaft having a portion thereof projecting rearwardly from said stationary housing member and forming a stem externally of the generator, and a supporting base having an upright portion engaged by said stem for mounting the generator on said base.

2. In an alternating current generator of the character described, a laminated annular stator member carrying an annular series of inductor elements, a stationary housing member located on one side of said stator member so as to form one end of the alternator housing and a support for said stator member, a fixed shaft mounted in said stationary housing member and extending substantially coaxially of said stator member, a rotor carrying a field winding and being rotatable in said stator member about the axis of said shaft, said rotor comprising complemental rotor members having transverse end wall portions spaced apart axially of said shaft, a disk member located on the opposite side of said stator member and forming the other end of said alternator housing, said disk member being connected with the end wall portion of one of said rotor members for rotation with said rotor, contact rings mounted in insulated relation on the end wall portion of the other of said rotor members and connected with said field winding, and brushes mounted on said stationary housing member and engaging said contact rings.

3. In an alternating current generator of the character described, a preformed laminated annular stator member carrying an annular series of inductor elements, a stationary housing member located on one side of said stator member and forming one end of the alternator housing, said stationary housing member comprising a transverse end wall and an axially extending annular wall having a recessed annular seat thereon, means mounting said stator member on said stationary housing member in engagement with said seat and in substantially coaxial relation to said annular wall, said stationary housing member having a cooling air inlet opening therein, a shaft having one end thereof mounted in fixed relation in and extending through said transverse end wall and its other end extending substantially coaxially of said annular wall and said stator member, a base having an upright portion engaging said one shaft end for supporting the alternator, a rotor located in said stator member and comprising a pair of toothed complemental rotor members and a field winding disposed therebetween, said rotor members having the teeth thereof extending axially into meshing relation and also having transverse end wall portions spaced apart axially of said shaft, spaced-apart antifriction bearings mounting said rotor for rotation on said shaft, a disk member located on the opposite side of said stator member and forming the other end of said alternator housing, said disk member being connected with the end wall portion of one of said rotor members for rotation with the rotor and being spaced from said stator member so as to define therebetween an annular air discharge passage, air impeller blades carried by said disk member and operable in said discharge passage, a drive pulley connected with said disk member, contact rings mounted in insulated relation on the end wall portion of the other rotor member and connected with said field winding, and brushes mounted on said transverse end wall and engaging said contact rings.

SEYMOUR FLOYD STEWART.
ALBERT D. GILCHRIST.

REFERENCES CITED

The following references are of record in the file of this patent:

UNITED STATES PATENTS

| Number | Name | Date |
|---|---|---|
| 2,067,155 | Levy | Jan. 5, 1937 |
| 2,119,398 | Morse | May 31, 1938 |
| 2,119,477 | Weydell | May 31, 1938 |
| 2,156,958 | Aydelott | May 2, 1939 |

FOREIGN PATENTS

| Number | Country | Date |
|---|---|---|
| 527,726 | Great Britain | Oct. 15, 1940 |